Patented June 11, 1940

2,204,511

UNITED STATES PATENT OFFICE 2,204,511

INSECTICIDE

Anderson W. Ralston and James Harwood, Chicago, and Ervin W. Hopkins, Hinsdale, Ill., assignors to Armour and Company, Chicago, Ill., a corporation of Illinois No Drawing. Application November 4, 1938, Serial No. 238,890

7 Claims. (Cl. 167—22)

This invention relates to insecticides, and more particularly to insecticidal compositions containing as the active ingredient dioctyl amine or its salts.

A large number of insecticides and insecticidal compositions are manufactured and marketed. Some of these function as stomach poisons meaning that they must be eaten by the insect before they are effective, while others, the so-called contact insecticides, act as respiratory paralyzers. With the latter group it is only necessary that the insect come in contact with either the vapors or liquid. The problem of insect control is quite complex and many factors other than its killing power enter into the value of a material as an insecticide. In the extermination of insects, such as moths, roaches, flies or other insects which frequent dwellings, it is necessary to employ chemicals non-toxic to humans. When animals are sprayed for the removal of lice, flies, etc., the chemicals used should be non-irritating and non-toxic; when trees and other vegetation are treated, chemicals not injurious to the vegetation must be employed. In all cases it is highly desirable to kill the insects with substances non-toxic to humans, but in a number of cases this is as yet not possible since certain insects can only be controlled by materials toxic to man.

The usual methods employed are to dissolve, emulsify or suspend the active ingredient in a solvent or carrier and spray this mixture. This procedure has a number of advantages: It allows of a uniform distribution of the active ingredient, it serves as a means of obtaining a properly adjusted lethal concentration of the material and it gives greater unit efficiency. Where the active ingredient is an organic chemical it is usually necessary to either dissolve it in an organic solvent, such as kerosene, or emulsify it in water by the use of various emulsifying agents, such as soaps, etc. It is always preferable to use solutions if possible since this insures more even distribution and is free of a number of objections inherent in emulsions or suspensions.

We have discovered that dioctyl amine or its salts is an effective contact insecticide. Where the amine or an amine salt such as the caproate is used the compound is applied in a refined kerosene solution or other organic solvent and where salts such as the acetate or hydrochloride is used water solutions or suspensions can be employed. These solutions are non-toxic to man and animals and the aqueous solutions do not injure foliage. In our experimental work we have used roaches, flies, moths, beetles and plant lice. Since our experimental work with flies has been more extensive it can be given as typical of the results which we have obtained.

The following gives a description of the method of obtaining the test flies and of the procedure used in testing:

Our breeding stock was obtained from wild house flies. The flies were placed in breeding cages and fed milk, and eggs were placed in Richardson's medium (Science 76, 350-1, 1932). Five to six hundred eggs from the breeding colony are then placed in one gallon jars containing about 120 cu. in. of Richardson's medium. The jars are covered with cheesecloth and kept at 74–78° F. and 53–58 percent relative humidity. After development the pupae are separated from the medium and placed in cages for emergence. The entire process takes about thirteen days. Approximately six hundred pupae are placed in each test cage. The test sprayings were made five days from the date when most of the flies emerged. The cage containing the flies is placed in the spraying chamber. This chamber is a cubical tin-lined box of thirty inch dimensions. Spraying is done through a half inch hole. The spraying was done with a De Vilbiss Atomizer No. 16 at a constant pressure of four pounds. The test cage containing the flies was left in the spraying chamber for ten minutes after spraying. Under our conditions of spraying we found it necessary to use 38 cc. of the National Association of Insecticide and Disinfectant Manufacturers Official Test Insecticide to obtain the recommended kill of 50 to 60 percent. After removal of the cage from the spraying chamber the flies knocked down were counted, and after chilling all flies were transferred to a clean cage. The dead flies were counted after twenty-four hours or in some cases after forty-eight hours. It will be noted that those flies able to fly after spraying were observed for a twenty-four hour period as our experience showed that many such flies died during the subsequent twenty-four hours. Our test differs materially in this respect from the Peet-Grady method. We have found our method to give reproducable results.

Using the above described method we have found that where the flies are sprayed with 38 cc. of a five percent solution of dioctyl amine in highly refined kerosene we obtain a knockdown of 100% and a kill of 99.5% after 48 hours. Using the same procedure the refined kerosene itself (containing no dioctyl amine) gave a kill of seven percent after forty-eight hours. Under these conditions the Official Test Insecticide in equivalent amounts gave a kill of 55% after twenty-four hours. Secondary amines with lower alkyl groups give much lower values. Dibutyl amine gives a kill of 83% and dipentyl and dihexyl amines kills of approximately the same order. When the alkyl groups of the secondary amines contain more than eight carbon atoms their effectiveness for this purpose is materially reduced. Thus, for example, didodecyl amine under similar conditions gives no knockdown and a kill of only 40% and ditetradecyl amine and diotadecyl amine have no effect. Secondary amines having alkyl groups containing less than eight carbon atoms are objectionable because of their highly irritating and unpleasant odor. Dioctyl amine does not possess these properties and is essentially odorless.

The salts of dioctyl amine may also be effectively employed either in conjunction with the free amine or separately. Thus, for example, a 5% solution of dioctyl amine caproate in refined kerosene gives a knockdown of 100% and a kill of 95% after forty-eight hours; a solution containing 2.5% of dioctyl amine and 2.5% of dioctyl amine caproate gives a knockdown of 99% and a kill of 95% after forty-eight hours.

The water-soluble salts of dioctyl amine, such as dioctyl amine hydrochloride show effective results against flies and roaches in both two percent and five percent concentrations or suspensions. For uses such as a household fly spray, etc., water solutions are less desirable because of their tendency to spot fabrics.

Whether the dioctyl amine shall be used in the form of a fatty acid salt, such as a caproate, or whether it shall be used in the form of an inorganic salt, such as a hydrochloride, acetate or sulfate, depends upon the liquid vehicle in which the salt is to be dissolved or suspended. The fatty acid salt, and the amine itself, are soluble in organic solvents of which the most commonly used is kerosene. Organic solutions of the free amine, common salts thereof, soluble in organic solvents, or mixtures thereof, are best used for domestic purposes. The less expensive water solutions of inorganic water-soluble salts of the dioctyl amine can be used around barns and similar places where there is no danger of water-spotting fabrics.

We are aware that others have suggested the use of certain amines as insecticides as disclosed, for example, in the Bousquet et al. Patent 2,030,093. But, as stated, we have not found the mono or triamines to be nearly as effective as our secondary amine in which the alkyl groups are octyl.

Having thus described our invention, what we claim is:

1. An insecticide containing as its essential active ingredient a compound chosen from the group consisting of dioctyl amine and its salts.

2. An insecticide containing as its essential active ingredient dioctyl amine.

3. An insecticide containing as its essential active ingredient dioctyl amine caproate.

4. An insecticide containing as its essential active ingredient dioctyl amine hydrochloride.

5. An insecticide comprising an organic solvent suitable for use as a spraying vehicle and containing as the essential active ingredient a dioctyl amine compound chosen from the group consisting of dioctyl amine and salts thereof soluble in the organic solvent.

6. An insecticide comprising kerosene containing as the essential active ingredient a dioctyl amine compound chosen from the group consisting of dioctyl amine and salts thereof soluble in kerosene.

7. An insecticide comprising an aqueous solution of a water-soluble salt of dioctyl amine.

ANDERSON W. RALSTON.
JAMES HARWOOD.
ERVIN W. HOPKINS.